Nov. 17, 1953
R. H. HIEGER
2,659,152
FUEL GAUGE FOR INTERNAL-COMBUSTION
ENGINE CARBURETORS
Filed Sept. 11, 1950
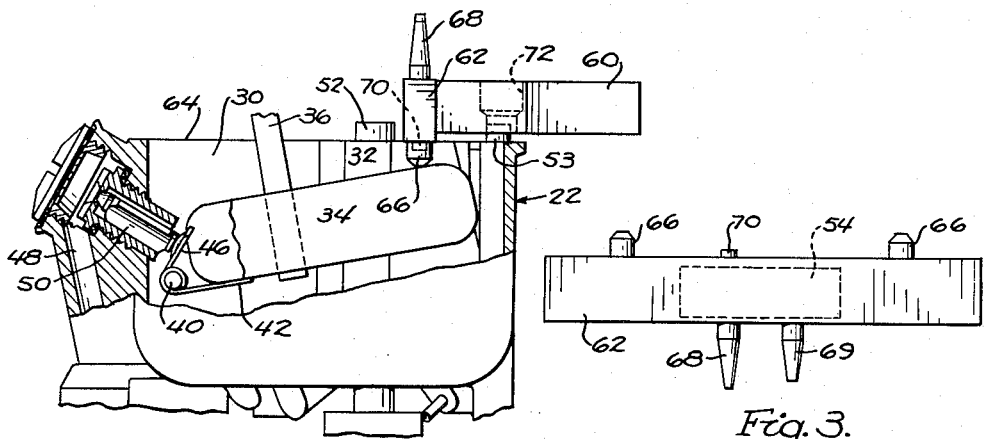
Fig. 1.
Fig. 3.
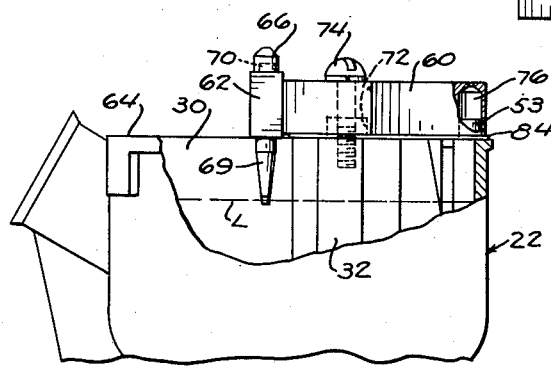
Fig. 2.
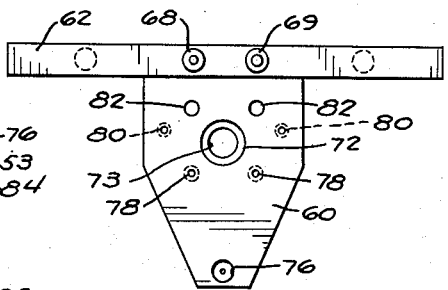
Fig. 4.
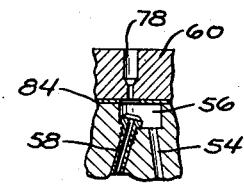
Fig. 5.
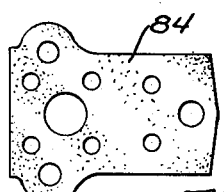
Fig. 6.
INVENTOR.
Robert H. Hieger
BY
A. R. McCrady
Attorney Patented Nov. 17, 1953

2,659,152

UNITED STATES PATENT OFFICE 2,659,152

FUEL GAUGE FOR INTERNAL-COMBUSTION ENGINE CARBURETORS

Robert H. Hieger, Detroit, Mich.

Application September 11, 1950, Serial No. 184,134

2 Claims. (Cl. 33—126.7)

1

This invention relates to a gauge for indicating the level of fuel in the constant level fuel reservoir of a carburetor.

The usual carburetor of the modern automobile comprises a fuel reservoir wherein the level of fuel is maintained at a theoretically constant level by means of a float mechanism which controls the inflow of fuel thereto from the fuel pump. It frequently happens that the float mechanism gets out of adjustment, so that the level of fuel maintained thereby is either too high or too low, causing malfunctioning of the engine.

Defective operation of the float mechanism is difficult to detect, since commercial carburetors are so constructed that it is impossible, without disassembling the carburetor, to determine directly what level of fuel is being maintained, and even if the carburetor is so disassembled the static fuel level with the engine inoperative (as it necessarily is when the carburetor is disassembled) will usually be different from the level which is maintained in the same carburetor when the engine is operative. Since proper operation of the engine depends on the proper fuel level being actually maintained during operation, it is desirable to provide apparatus for determining the fuel level when the engine is operated. An object of the present invention is to provide such apparatus.

In the preferred form of the invention, the gauge is in the form of a plate designed to temporarily replace the air horn section of the carburetor and comprising such elements that the engine may be operated with the air horn section removed and with the device of the present invention installed on the remainder of the carburetor. The device also includes a mechanical means for indicating visually the actual position of the carburetor float relative to its proper or designed position.

An object of the invention is to provide a fuel gauge which will accurately reveal the level of fuel in a carburetor.

A further object of the invention is to provide a fuel level indicator for an automobile carburetor which may be applied to the carburetor while it is in position on the engine and which will indicate any deviations from the proper level of fuel in the float chamber.

A further object of the invention is to provide a fuel gauge which will indicate the level of fuel in the carburetor while the engine is in operation.

A further object is to provide improved apparatus and method for determining fuel level in a carburetor.

Further objects and advantages of the invention will be apparent from the following description, taken in connection with the appended drawing, in which:

Fig. 1 is a view partly in vertical section of the main body section of an automobile carburetor showing the device of the present invention applied thereto for gauging the position of the float.

Fig. 2 is a similar view showing the device applied to the carburetor to indicate the level of fuel in the fuel reservoir.

Fig. 3 is a view in elevation of the gauge.

Fig. 4 is a plan view of the same.

Fig. 5 is a fragmentary sectional view showing a detail of the carburetor construction with the gauge mounted thereon.

Fig. 6 is a plan view of a gasket forming part of the invention.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

The carburetor partially shown by way of example in Figs. 1, 2 and 3, is a downdraft double-barreled carburetor of known make, and comprises an air horn section, not shown, a main body section 22, and a throttle body, not shown. The main body section includes a float chamber 30 the cover of which is formed by the air horn section, the latter having been removed to permit installation of applicant's gauge. The float chamber contains a float 34 of known design and including two like float members each having an arcuate contour when viewed in plan. The float 34, when properly adjusted, operates in known manner to maintain the fuel in the float chamber at the level indicated at L in Fig. 2.

In Fig. 1, the air horn section has been removed, and the float 34 has been moved upwardly as far as it will go by means of any suitable tool 36. This position corresponds to the highest position occupied by the float when normally installed in the carburetor, such as would occur if the fuel level in the float chamber were at maximum. In the example shown, the float is pivotally connected to the main body section by means of a pivot pin 40. A bracket 42 secured to the float has a portion which embraces the pin 40 in pivoting relation, and also is formed with a prong 46 which actuates the movable valve member 50 controlling the inflow of fuel from the fuel passage 48. In order to function properly, the prong 46 should arrest the upward movement of the float at approximately the position shown in Fig. 1, in which position the valve 50 is fully seated.

Extending vertically through the float chamber and cast integral with the main body section of the carburetor is a boss 32 comprising a number of passages for fuel and air which, when the carburetor is in assembled relation, communicate at their upper ends with certain mating passages in the air horn section, and at their lower ends with the induction passage of the carburetor through the main fuel nozzle and other elements of the carburetor, none of which are shown since they do not constitute a part of the present invention. Projecting above the level of the remainder of the main body section is a sleeve 52 having a threaded bore to receive a screw, not shown, for securing the air horn section to the main body section; and also a sleeve 53 having a bore forming an idling passage. The boss 32 is also formed at each side with an upwardly extending fuel passage 54 (Fig. 5) which empties into a recess 56 leading to one of the main nozzles 58. In the normal operation of the carburetor an air bleed passage, not shown, in the air horn section communicates with the recess 56.

The gauge constituting the present invention comprises a plate 60 having a bar 62 at one end thereof, the two elements being either formed integral with each other or secured together as by welding. The bar 62 is designed to rest upon the horizontal upper surface 64 of the main body section as indicated in Figs. 1 and 2. It carries two studs 66 which, in the position shown in Fig. 1, just touch the floats 34 when the same are drawn to their upper limit of movement as above explained. Projecting from its opposite edge, bar 62 is provided with two pins 68, 69, of slightly different length, for a purpose to be described. Bar 62 also is formed with a stud 70 which, when the gauge is applied to the main body section as shown in Fig. 1, seats in one of the fuel passages in boss 32 and thereby acts as a locating means for the gauge.

The plate 60 is formed with a bore 72 designed to receive sleeve 52 (Fig. 2), and having a reduced portion to receive a screw 74 which is screwed into the bore of said sleeve to secure the gauge to the main body section in the position shown in Fig. 2. The reduced portion of this bore also, when the gauge is applied as shown in Fig. 1, receives sleeve 53 and thus acts as a locating means for the gauge. Near its outer end the plate 60 is formed with a bore 76 which receives the sleeve 53 when the gauge is applied as shown in Fig. 2 and terminating in a calibrated orifice to bleed air at a metered rate into the idling passage above mentioned. Similar bores 78, having calibrated air bleed ports as shown in Fig. 5, are formed in the plate in position to communicate with recesses 56 and provide air bleeds for the idle fuel passages, and similar bores 80, 82 communicate with the opposite ends of the passages leading to the main nozzle and bleed air into said passages. A gasket 84, fitted over the upper end of member 32, is provided with apertures to permit communication between the passages of member 32 and the bores of plate 60. The function of the various bores in plate 60 just described, and of the apertures in gasket 84, is to supply metered air to the carburetor in substitution for the air horn section when the latter is replaced by the gauge constituting the present invention.

The operation of the device begins with the carburetor in place on the engine of the vehicle, which should rest on a level floor. In order to determine whether the float is properly located with respect to valve 50, the air horn section is removed and the gauge is applied to the main body section in the manner shown in Fig. 1. The float 34 is then raised up as high as permitted by the prong 46. If the individual members of the float 34 are in proper adjustment, each of them will just touch the studs 66 but will not raise the gauge from the position shown. If by this test the float, or either float member, is shown to be out of proper adjustment, the prong 46 or other elements of the bracket 42 may be bent so that when the test is repeated the end of each of the two float members will just touch its stud 66. This adjustment will of itself remedy most cases of incorrect fuel level.

It is desirable, however, to determine the actual level of fuel obtaining in the float chamber while the engine is operating, since this level will vary somewhat with varying pressure of incoming fuel from the fuel pump and with other factors. For this purpose, the gasket 84 is applied to the boss 32 and the plate 60 fitted thereover in the position indicated in Fig. 2, and held in place by the screw 74, which may be one of the screws which serve to secure the air horn section to the main body section. The engine is then cranked to fill the float chamber, and the static fuel level read by means of pins 68 and 69. This level, after the adjustment above described, will usually be found to be correct; that is, the fuel level in the float chamber will usually be just above the lower end of pin 68 and just below the lower end of pin 69, but if it is found to be either too high or too low a further adjustment of bracket 42 and/or prong 46 may be made.

The engine is then started, and will operate because, as above explained, the plate 62 with its passages will maintain operable conditions in the carburetor. The engine is operated at idling speed in order to determine the fuel level under operating conditions. If, when the engine has idled for five or ten minutes, the level in the gauge has increased substantially, it may be assumed that there is leakage at the valve 50, and appropriate steps taken to correct it.

Although the invention has been described with reference to a particular embodiment thereof, it may be embodied in other forms within the skill of artisans in this art, and is not limited except in accordance with the terms of the following claims.

I claim:

1. A test gauge for a carburetor having a float chamber with a float operatively arranged therein to maintain the fuel in said chamber at a predetermined level, said float chamber having walls with top edges adapted to receive an air horn section to close said chamber, and a column formed within said chamber and extending to the top thereof, said column providing a body for a number of fuel and air passages registering with their completing portions provided in the air horn when the same is mounted in place at the top of said float chamber; said gauge comprising a plate adapted to fit at the top edges of the float chamber when the air horn section is removed and to become located thereat to fit over said column and having calibrated fuel and air passages corresponding to those in the air horn section and adapted to complete the passages in said column similarly to said air horn section to maintain operation of the carburetor, and two pins provided on said plate, one of said pins extending beyond said plate surface for a distance equal to the distance from the top edges of the float chamber walls to the plane of the lowest permissible level of fuel in said chamber, and the other of said pins extending beyond said plate surface for a distance equal to the distance from the top edges of the float chamber walls to the plane of the highest permissible level of fuel in said chamber.

2. The construction defined in claim 1, said plate being adapted to be retained in place at the top of the float chamber with a screw engaging the tapped hole receiving the air horn holding screw.

ROBERT H. HIEGER.

References Cited in the file of this patent

UNITED STATES PATENTS

| Number | Name | Date |
|---|---|---|
| 1,144,061 | Pritchard | June 22, 1915 |
| 2,098,963 | Hexter | Nov. 16, 1937 |